United States Patent
Liu et al.

(10) Patent No.: US 10,633,588 B2
(45) Date of Patent: Apr. 28, 2020

(54) PREPARATION AND USE OF SLOW-RELEASE IRON-BASED BIOCHAR SOIL HEAVY METAL PASSIVATOR

(71) Applicant: Guangdong Institute of Eco-Environmental Science & Technology, Guangzhou (CN)

(72) Inventors: Chuanping Liu, Guangzhou (CN); Fangbai Li, Guangzhou (CN)

(73) Assignee: GUANGDONG INST. OF ECO-ENVIRONMENTAL SCIENCE&TECH, Guangzhou (CN)

( * ) Notice: Subject to any disclaimer, the term of this patent is extended or adjusted under 35 U.S.C. 154(b) by 253 days.

(21) Appl. No.: 15/571,182

(22) PCT Filed: Apr. 12, 2016

(86) PCT No.: PCT/CN2016/079109
§ 371 (c)(1),
(2) Date: Nov. 1, 2017

(87) PCT Pub. No.: WO2017/133079
PCT Pub. Date: Aug. 10, 2017

(65) Prior Publication Data
US 2018/0119008 A1    May 3, 2018

(30) Foreign Application Priority Data
Feb. 1, 2016   (CN) .......................... 2016 1 0071104

(51) Int. Cl.
C05G 3/04         (2006.01)
C09K 17/50        (2006.01)
(Continued)

(52) U.S. Cl.
CPC ................ *C09K 17/50* (2013.01); *B09C 1/08* (2013.01); *C05D 9/02* (2013.01); *C05F 11/00* (2013.01);
(Continued)

(58) Field of Classification Search
None
See application file for complete search history.

(56) References Cited

U.S. PATENT DOCUMENTS 9,359,267 B2 *  6/2016  Yu ........................... C05F 11/02

FOREIGN PATENT DOCUMENTS

| CN | 102205231 A | 10/2011 |
| CN | 103641637 A | 3/2014 |

(Continued)

OTHER PUBLICATIONS

Journal of Agro-Environment Science; 2014; 33 (9): 1817-1822; Phosphorus Adsorption by and Forms in Fe-modified Biochar; Jiang Xu-tao.

*Primary Examiner* — Wayne A Langel
(74) *Attorney, Agent, or Firm* — The Dobrusin Law Firm, P.C.; Bryan S. Lemanski (57) ABSTRACT

The invention discloses a method for the preparation and use of a slow-release iron-based biochar soil heavy metal passivator. The slow-release iron-based biochar soil heavy metal passivator of the present invention is prepared by an one-step method, wherein iron-based biochar, kaolin and a biological starch are mixed into a core material in a specific ratio; an acidic silica sol and a chitosan solution are prepared, under the effects of an alkaline catalyst and an emulsifier, as a chitosan and silica-sol composite material as a coating, and the iron-based biochar is coated with the alkaline coating material, with the core material and the coating material being controlled at a certain volume ratio.

(Continued)

The passivator has a wide raw material source, a simple and convenient preparation process, easy industrialized production, and can passivate the heavy metal arsenic and cadmium efficiently and inhibit the absorption and accumulation of arsenic and cadmium. The passivator prepared by the present invention can last for 4 growing seasons and has a higher passivation efficiency and a longer action time than common iron-based biochar passivators. The passivator can be widely used in the control of arsenic and cadmium pollution farmland.

10 Claims, 5 Drawing Sheets

(51) Int. Cl.
*B09C 1/08* (2006.01)
*C05F 11/00* (2006.01)
*C05G 3/00* (2020.01)
*C05D 9/02* (2006.01)
*C05F 11/02* (2006.01)
*C09K 101/00* (2006.01)

(52) U.S. Cl.
CPC ............... *C05F 11/02* (2013.01); *C05G 3/00* (2013.01); *C05G 3/0011* (2013.01); *C05G 3/0082* (2013.01); *C05G 3/04* (2013.01); *C09K 2101/00* (2013.01)

(56) References Cited

FOREIGN PATENT DOCUMENTS

| | | |
|---|---|---|
| CN | 104388094 A | 3/2015 |
| CN | 104629092 A | 5/2015 |
| CN | 105061054 A | 11/2015 |
| WO | 2013/126477 A1 | 8/2013 |

* cited by examiner

PREPARATION AND USE OF SLOW-RELEASE IRON-BASED BIOCHAR SOIL HEAVY METAL PASSIVATOR

TECHNICAL FIELD

The invention belongs to the field of soil heavy metal remediation, and in particular to the preparation and use of a slow-releasing iron-based biochar soil heavy metal passivator.

BACKGROUND ART

With the development of industrial and agricultural production, agricultural environmental pollution, especially soil heavy metal pollution problem has become more and more prominent. It is estimated that up to 12 million tons of grain is polluted by heavy metals in China every year, resulting in direct economic losses of more than 20 billion Yuan. The soil environmental quality is directly related to the safety of agricultural products; the quality and safety problems of agricultural products and mass incidents caused by soil pollution increase year by year and become an important factor affecting people's health and social stability. For most heavy metal pollution of farmland soil in China, it is difficult to use a single repair technology to solve the problem. It is urgent to develop a method to control the heavy metals in farmland soils which can be widely applied, low-cost, and can reduce the content of heavy metals in agricultural products.

Heavy metal passivation technology is considered to be one of the most effective measures to control the heavy metal pollution in farmland soil. By the application of a soil-friendly conditioning agent, passivation of heavy metals in pollution soil, and reducing the absorption of heavy metals in crops, to achieve both the control of the heavy metal pollution of agricultural soil and the production, is a new idea of soil heavy metal control, which is both economic and safe. Soil heavy metal passivation technology has a relatively low investment, a high repair efficiency, and a simple operation; it has better advantages for remediation of large areas of low-level heavy metal pollution, which can meet the current soil pollution control of agricultural soil and to guarantee the safety needs of agricultural products in China.

In recent years, biochar for the passivation of heavy metal pollution soil has gained more and more attention. Because the biochar contains a large number of carboxyl groups, hydroxyl groups and acid anhydride groups, as well as negative charges, a large specific surface area, a wide range of raw materials and a low price, biochar has gained great attention and extensively studied in soil heavy metal remediation. Biochar can increase the pH value of acidic soil and increase the cation exchange capacity, so as to adsorb pollutants and heavy metals in the soil and reduce the accumulation of Cd, Pb and Zn in the body of crops. However, since the mobility of As increases with the increase of the soil pH, it tends to bind to Fe, Al, and Mn oxides and hydroxides with anion exchange sites in the soil, which implies that the addition of biochar to the soil is not necessarily to control the bioavailability of As. As founded by Zheng et al., in researches, the migration ability of Cd, Zn, Pb and As in soil is significantly affected by the application of biochar to pollution rice paddy soil; the concentrations of Cd, Zn and Pb in rice roots are reduced by 98%, 83% and 72%, while the concentration of arsenic is increased by 327%. Because most of the farmland soil is of heavy metal combined pollution, this also poses a challenge to the application of biochar in heavy metal passivated farmland.

Although in our previous patent, "an iron-based biochar material, the preparation process therefor and use thereof in soil pollution control (Application number: 201410538633.8)", the iron-based modification of the biochar can be a good solution for the simultaneous passivation of arsenic-cadmium combined pollution in soil; but its preparation process is relatively complicated. At the same time, because most of the biochar materials have a loose porous structure, and will soon react with the soil solution, once applied in soil, and the adsorption and fixation of heavy metals will reach saturation in a very short period of time. Because of large buffer performance of soil, the heavy metal ions in the soil solution will be released from soil colloids or soil minerals slowly after having been adsorbed by biochar. Therefore, if the biochar powder is directly applied to the farmland, a larger amount of the biochar is often used, in an amount of 1 ton or even several tons per acre, so as to have a better inhibition of heavy metal absorption and accumulation effect in the current season rice. To the next season, when the rice is planted, the same high dose of biochar is also needed, which will not only result in waste of resources, but also increase labour input. Moreover, biochar is relatively light, so the direct application tends to results in dust, which not only will cause waste, but will also have adverse effects on the health of users; furthermore, the application in the paddy field will also tends to result in floating on the water, and to accumulation at the downwind area due to the uneven application, and also the biochar may be flowed away by drainage water, thus leading to waste.

SUMMARY OF THE INVENTION

In order to overcome the disadvantages and shortcomings of the prior art, a primary object of the present invention is to provide a method for preparing a slow-release iron-based biochar soil heavy metal passivator.

Another object of the present invention is to provide a slow-release iron-based biochar soil heavy metal passivator prepared by the above-mentioned production method; the material is prepared using iron-based biochar and bio-starch as a core material, followed by granulation then coating with a chitosan silica gel composite film, wherein the coating material of the chitosan silica gel composite film not only overcomes the not enough strength of the chitosan material, but also avoids the shortcomings of the easy fracture of the silicone material.

The slow-release iron-based biochar core material is prepared by a one-step method, and the preparation process is simple. The slow-release iron-based biochar soil heavy metal passivator prepared by the invention can be stable and can be widely applied to the heavy metal passivation of agricultural soil and inhibit the absorption and accumulation of heavy metals by crops. Compared with the traditional soil passivators, the slow-release iron-based bio-carbon soil heavy metal passivator has the advantages of a low application dose, a good heavy metal passivation effect and a long-term effect, can have a heavy metal passivation effect for more than 2 years, can passivate arsenic and cadmium at the same time, and can be applied to the combined heavy metal pollution farmland.

A further object of the present invention is to provide a method of using a slow-release iron-based biochar soil heavy metal passivator.

The object of the present invention is achieved by the following technical solution:

A method for preparing a slow-release iron-based biochar soil heavy metal passivator, comprising the steps of:

(1) preparation of iron-based biochar precursor: drying the biomass in the air, crushing the same to an appropriate size and placing to a high-temperature furnace, increasing the temperature to 300° C. to 800° C. under the conditions of air isolation, and keeping this temperature for 3 to 12 hours, stopping heating to prepare the iron-based biochar precursor;

(2) preparation of iron-containing solution: formulating a ferric salt or ferrous salt into a solution of an iron content of 0.5% to 5% by mass;

(3) preparation of iron-based biochar: to the iron-based biochar precursor prepared in step (1), adding, under stirring, the iron-containing solution prepared in step (2) under the conditions of keeping the temperature at 80 to 350° C., wherein the mass ratio of the iron-based biochar precursor to the iron-containing solution is 1:0.2 to 1:5; after having been stirred until uniform, cooling the mixture to room temperature, drying, crushing and sieving to prepare the iron-based biochar material;

(4) preparation of the core material: mixing the iron-based biochar material prepared in step (3), kaolin and biological starch at 100:0.5:1 to 100:5:10 by weight part, until uniform, adding water or spraying water under stirring to a water content of 50% to 80%, and then drying to obtain the core material;

(5) preparation of coating material: slowly adding the chitosan solution into an acidic silica sol at 55-75° C. under the stirring conditions to control the volume ratio of the chitosan solution to the acidic silica sol to 1:2 to 1:5, after the completion of the addition, heating the same at 55-75° C. for 0.5-1 h to obtain an acidic coating material precursor; slowly adding an emulsifier to the prepared acid coating material precursor under stirring at 55-75° C., wherein the emulsifier is control in an amount of 0.5% to 5% of the chitosan, stirring until uniform, then adding an alkaline catalyst for catalysis, and keeping the conditions of 55 to 75° C. under stirring for 1 to 1.5 h, controlling the pH to 9 to 11; removing bubbles by vacuum, to prepare an alkaline coating material;

(6) preparation of slow-release iron-based biochar soil heavy metal passivator: coating the core material prepared in step (4) with the alkaline coating material prepared in step (5), and controlling the mass volume ratio of the core material to the alkaline coating material to 30:1 to 5:1, and drying the coating in the air to obtain a slow-release iron-based biochar soil heavy metal passivator product.

The slow-release iron-based biochar soil heavy metal passivator prepared by the above-mentioned preparation method has a controlled coating thickness of 0.5-1 mm.

In step (1), the temperature is increased to 300° C. to 800° C. at a rate of 5° C. to 10° C./min.

Said biomass in step (1) is preferably one or more of waste woody or herbaceous roots, stems and leaves.

Said iron salt in step (2) may be one or more of ferric chloride, ferric nitrate, and ferric sulphate; said ferrous salt may be one or more of ferrous chloride, ferrous nitrate, ferrous sulphate.

The iron-based biochar material prepared in the step (3) has an iron content of 0.5% to 13%, preferably 2.5 to 7.5% by mass.

The temperature of said iron-based biochar precursor described in step (3) is maintained at 100 to 200° C.

Said sieving in step (3) means passing through a 60-mesh sieve.

(4) The weight ratio of said iron-based biochar material to the kaolin clay to the biological starch is 100:1:2 to 100:2.5:5.

Said bio-starch in step (4) may be corn flour, sweet potato flour, potato flour or tapioca flour.

The core material prepared in step (4) has a particle size of 3 to 5 mm.

Said emulsifier in step (5) can be one or a mixture of more of polyacrylamide, sodium alkyl benzene sulfonate, Arabian gum, Twain series, and Span series; said alkaline catalyst can be one or a mixture of more of sodium hydroxide, potassium hydroxide, and aqueous ammonia.

The mass volume ratio of said core material to the alkaline coating material in step (6) is preferably 15:1 to 10:1.

The acidic silica sol described in the above production method is prepared by the following steps:

a metal silicon powder, a metal silicate, etc., are used as raw materials, the selected raw materials are required to have a less impurity content, and the metal silicate can be selected from $Na_2SiO_3$, $K_2SiO_3$ or $Li_2SiO_3$, preferably $Na_2SiO_3$. The above raw materials are slowly added to the alkaline solution under strong stirring conditions, to formulate a metal silicate solution. The selected alkaline solution may be formulated with sodium hydroxide, potassium hydroxide, aqueous ammonia or the like, preferably aqueous ammonia; the concentration of the alkaline solution is 0.1 to 5 M, preferably 0.2 to 2 M. The concentration of the formulated metal silicate is required to be 5% to saturation by weight, and the pH is 10 to 13%. The resulting precursor solution is passed through a multi-stage strong acid cation exchange resin exchange column at a constant rate, and the pH value of the collecting solution at the column outlet is controlled between 1 and 4, and the active acidic silica sol precursor is obtained. The active acidic silica sol precursor is heated by microwave (or a water bath) for 15 min and then aged for 60 min by static cooling to prepare an acidic silica sol. The acidic silica sol controls the pH value to be 1 to 4 and the mass fraction is 5 to 15%.

Said chitosan solution in the above preparation method is prepared by dissolving chitosan in a 0.1 to 100 mM acidic solution, heating in a water bath at 55 to 75° C. under stirring, continuing heating at 55 to 75° C. conditions for 0.5 to 1 h after having the chitosan completely dissolved, to prepare the chitosan solution. The acidic solution can be one or a mixture of more of nitric acid, oxalic acid, acetic acid, citric acid, tartaric acid, hydrochloric acid and sulfuric acid; the above-mentioned acidic chitosan solution is controlled to a mass percentage of chitosan to 3 to 5% and a pH of 1-4.

The method of using said slow-release iron-based biochar soil heavy metal passivator includes the following steps:

after ploughing a paddy field evenly, uniformly applying the slow-release iron-based biochar soil heavy metal passivator of 100 to 300 kg as a base fertilizer; during the application the field being maintained flooded at 3 to 5 cm; transplanting rice 5 to 10 days after the application.

Compared with the prior art, the present invention has the following advantages and beneficial effects:

(1) after the iron-based biochar is coated by the technology of the present invention, the passivator is convenient to apply, will not form dust and float on the water surface of the paddy field; therefore, the product of the present invention can passivate the heavy metals effectively in a less amount, save materials and manpower.

(2) The passivator prepared by the technology of the present invention is uniform in particle size; at the same time, because the chitosan is compounded with silica sol, the coating is not easy to be broken, and the passivator can be stably and passively fixed to the soil heavy metal; the passivator prepared by the present invention can effectively inhibit the absorption and accumulation of heavy metals by crops.

(3) Compared with the traditional coating materials, chitosan silica sol composite coating material not only has good slow-release performance, but the silica sol itself has strong adsorption and fixation performance for heavy metals, and in addition, silicon is a useful element for plant growth; the chitosan has the functions of promoting the seed germination, improving the soil microbial structure and improving the physical and chemical properties of the soil; therefore, the slow-release iron-based biochar soil heavy metal passivator material provided in the present invention not only can passivate heavy metals in the soil, but also can improve the crop yield.

(4) The passivator prepared by the technology of the invention not only can adsorb and fix the heavy metals such as cadmium in the soil, but also can fix the arsenic by oxidation. Therefore, the technology of the present invention can be applied to the heavy metal combined pollution farmland, and solves the technical difficulty that arsenic and cadmium cannot be passivated efficiently at the same time.

(5) The technology of the present invention has a wide range of sources, a low price, and is non-toxic and harmless; and the production process is relatively simple and easy to mass-scale industrial production.

PARTICULAR EMBODIMENT

Hereinafter, the present invention will be described in further detail with reference to embodiments and figures, but the embodiments of the present invention are not limited thereto.

The acidic silica sol used in the examples of the present invention is prepared by the following steps:

200 mL of water is taken, and 0.5 g of sodium hydroxide is added therein; the stirrer is started and the temperature is increased to 55° C., and then 250 g of $Na_2SiO_3$ is added, fully dissolved and cooled to room temperature; an alkaline solution of a pH value of 12.8 is prepared. The alkaline silica solution is passed through a 100 mL (a wet volume) hydrogen-type strongly acidic cation multi-stage exchange resin column at a rate of 5 mL/min; the collected solution at the column outlet is controlled at a pH value of 2 to 3, heated to 50° C. by microwave (or water bath), followed by static cooling and ageing for 30 min, and an acidic silica sol is obtained for use. The acidic silica sol is controlled at a pH of 2.5 and the mass fraction of silica is 13%. The mass ratio of the sodium hydroxide to $Na_2SiO_3$ is changed to prepare an acidic silica sol with a pH value of 4.0 and a silica mass fraction of 5%, an acidic silica sol with a pH value of 2.0 and a silica mass fraction of 15%, an acidic silica sol solution with a pH value of 3.0 and a silica mass fraction of 12% and an acidic silica sol solution with a pH value of 1.0 and a silica mass fraction of 10%, respectively.

EXAMPLE 1

Preparation of Slow-release Iron-based Biochar Soil Heavy Metal Passivator from Agricultural Wastes as Raw Material Rice straws, rice husks and other agricultural waste are dried in the air, and crushed, and 99.5 kg is weighed, placed in a high-temperature furnace; the temperature is increased to 300° C. under the conditions of isolation at a rate of 5° C./min, and the heating is performed at this temperature for 12 h, and then the heating is stopped. 100 L of a ferric chloride solution with an iron content of 0.5% by mass is prepared and quickly added into a high temperature furnace and maintained at a temperature of 80° C. by heating while stirring, followed by cooling, drying in the air, crushing and passing through a 60-mesh sieve to obtain the iron-based biochar with an iron mass fraction of 0.5%. The iron-based biochar, kaolin and corn flour are mixed at a mass ratio of 100:5:10, sprayed with water to a 50% water content, granulated and dried to obtain the iron-based biochar core material with a particle size of 5±0.5 mm.

Additionally, 3 g of chitosan is dissolved in about 97 ml of a 0.1 mM hydrochloric acid solution at 55° C. under water bath conditions, the heating is performed while stirring; after having been completely dissolved, the heating is continued in 55° C. water bath conditions for 0.5 h; finally the pH is adjusted to 4.0, and the mass fraction of the chitosan is about 3%. Then, the chitosan solution is slowly added to the acidic silica sol having a pH value of 4.0 and a silica mass fraction content of 5% in the water bath of 55° C., and the addition is performed under stirring; after the completion of the addition, the heating is continued under 55° C. water bath conditions for 0.5 h. Then 0.015 g of Span-80 is further added under 55° C. water bath conditions while stirring; finally, 0.01 M of sodium hydroxide is added slowly until the pH is 9, and the addition is stopped; and the heating is continued under 55° C. water bath conditions for 0.5 h; the alkaline coating material is obtained.

The above-mentioned iron-based biochar core material is coated with the above-mentioned alkaline coating material, and the mass volume ratio of the core material to the coating material is controlled at 5:1; the coating is dried in the air to obtain a slow-release iron-based biochar soil heavy metal passivator, and the passivator coating film is 0.70±0.15 mm.

EXAMPLE 2

Preparation of Slow-release Iron-based Biochar Soil Heavy Metal Passivator from Sawdust as Raw Material 99 kg of dried sawdust is weighed, placed in a high-temperature furnace; the temperature is increased to 800° C.

under the conditions of isolation at a rate of 10° C./min, and heating is performed at this temperature for 3 h, and then the heating is stopped. 20 L of a ferric nitrate solution with an iron content of 5% by mass is prepared and quickly added into a high temperature furnace and maintained at a temperature of 350° C. by heating while stirring, followed by cooling, drying in the air, crushing and passing through a 60-mesh sieve to obtain the iron-based biochar with an iron mass fraction of 1%. The iron-based biochar, kaolin and cassava flour are mixed at a mass ratio of 100:5:10, sprayed with water to a 80% water content, granulated and dried to obtain the iron-based biochar core material with a particle size of 4±0.5 mm.

Additionally, 4.5 g of chitosan is dissolved in about 95.5 ml of a 100 mM critic acid solution at 75° C. under water bath conditions, the heating is performed while stirring; after having been completely dissolved, the heating is continued under 75° C. water bath conditions for 0.5 h; finally the pH is adjusted to 2.0, and the mass fraction of the chitosan is about 4.5%. Then, the chitosan solution is slowly added to the acidic silica sol having a pH value of 2.0 and a silica mass fraction content of 15% in the water bath of 75° C., and the addition is performed under stirring; after the completion of the addition, the heating is continued under 75° C. water bath conditions for 0.5 h. Then 0.225 g of sodium dodecyl-benzene sulfonate is further added under 75° C. water bath conditions while stirring; finally, 0.5 M of aqueous ammonia is added slowly until the pH is 10, and the addition is stopped; and the heating is continued under 75° C. water bath conditions for 0.5 h; the alkaline coating material is obtained.

The iron-based biochar core material is coated with the alkaline coating material, and the mass volume ratio of the core material to the coating material is controlled at 30:1; the coating is dried in the air to obtain a slow-release iron-based biochar soil heavy metal passivator, and the passivator coating film is 0.55±0.05 mm.

EXAMPLE 3

Preparation of Slow-release Iron-based Biochar Soil Heavy Metal Passivator for Soil with Mixed Material as Raw Material Dried sawdust, straws and palm fibres are mixed until uniform and crushed, and 97.5 kg is weighed, placed in a high-temperature furnace; the temperature is increased to 550° C. under the conditions of isolation at a rate of 10° C./min, and heating is performed at this temperature for 5 h, and then the heating is stopped. 500 L of a ferric chloride solution with an iron content of 0.5% by mass is prepared and quickly added into a high temperature furnace and maintained at a temperature of 550° C. by heating while stirring, followed by cooling, drying in the air, crushing and passing through a 60-mesh sieve to obtain the iron-based biochar with an iron mass fraction of 2.5%. The iron-based biochar, kaolin and potato flour are mixed at a mass ratio of 100:5:10, sprayed with water to a 50% water content, granulated and dried to obtain the iron-based biochar core material with a particle size of 4.5±0.5 mm.

Additionally, 5 g of chitosan is dissolved in about 95 ml of a 50 mM nitric acid solution at 60° C. under water bath conditions, the heating is performed while stirring; after having the mixture completely dissolved, the heating is continued under 60° C. water bath conditions for 0.5 h; finally the pH is adjusted to 3.0, and the mass fraction of the chitosan is about 5%. Then, the chitosan solution is slowly added to the acidic silica sol having a pH value of 3.0 and a silica mass fraction content of 12% under 60° C. water bath conditions, and the addition is performed under stirring; after the completion of the addition, the heating is continued under 60° C. water bath conditions for 0.5 h. Then 0.125 g of polyacrylamide is further added under 60° C. water bath conditions while stirring; finally, 0.25 M of aqueous ammonia is added slowly until the pH is 9.5, and the addition is stopped; and the heating is continued under 60° C. water bath conditions for 0.5 h; the alkaline coating material is obtained.

The iron-based biochar core material is coated with the alkaline coating material, and the mass volume ratio of the core material to the coating material is controlled at 10:1; the coating is dried in the air to obtain a slow-release iron-based biochar soil heavy metal passivator, and the passivator coating film is 0.65±0.10 mm.

EXAMPLE 4

Preparation of Slow-release Iron-based Biochar Soil Heavy Metal Passivator using Palm Fibre as Raw Material Rice palm fibres are dried in the air, and 95 kg is weighed and crushed, placed in a high-temperature furnace; the temperature is increased to 500° C. under the conditions of isolation at a rate of 10° C./min, and heat is performed at this temperature for 3 h, and the heating is stopped. 200 L of a ferrous sulphate solution with an iron content of 2.5% by mass is prepared and quickly added into a high temperature furnace and maintained at a temperature of 150° C. by heating while stirring, followed by cooling, drying in the air, crushing and passing through a 60-mesh sieve to obtain the iron-based biochar with an iron mass fraction of 5%. The iron-based biochar, kaolin and sweet potato flour are mixed at a mass ratio of 100:1.5:3, sprayed with water to a 65% water content, granulated and dried to obtain the iron-based biochar core material with a particle size of 3.5±0.5 mm.

Additionally, 5 g of chitosan is dissolved in about 95 ml of a 10 mM acetic acid solution at 65° C. under water bath conditions, the heating is performed while stirring; after having the mixture completely dissolved, the heating is continued under 65° C. water bath conditions for 1 h; finally the pH is adjusted to 1.0, and the mass fraction of the chitosan is about 5%. Then, the chitosan solution is slowly added to the acidic silica sol having a pH value of 1.0 and a silica mass fraction content of 10% in the water bath of 65° C., and the addition is performed under stirring; after the completion of the addition, the heating is continued under 65° C. water bath conditions for 1 h. Then 0.025 g of Tween-80 is further added under 65° C. water bath conditions while stirring; finally, 0.5 M of potassium hydroxide is added slowly until the pH is 11, and the addition is stopped; and the heating is continued under 65° C. water bath conditions for 1 h; the alkaline coating material is obtained.

The iron-based biochar core material is coated with the alkaline coating material, and the mass volume ratio of the core material to the coating material is controlled at 15:1; the coating is dried in the air to obtain a slow-release iron-based biochar soil heavy metal passivator, and the passivator coating film is 0.65±0.10 mm.

EXAMPLE 5

Pot Experiments of Passivation of Soil Heavy Metal by Material Prepared from Different Example The test paddy soil is collected from the cadmium-arsenic combined pollution paddy soil in Lianhuashan tungsten mine, Shantou city, Guangdong province, China; the sample collection depth is 2-25 cm; the soil is dried in the air, passed through a 20-mesh sieve, and repeatedly mixed until uniform. The test crop is rice, and the rice seeds are supplied by the Guangdong Institute of Eco-Environment and Soil; the rice variety is You You 128. The basic properties of the soil are shown in Table 1.

TABLE 1

Basic physical and chemical properties of the test soil in pot

| Test items | Content |
| --- | --- |
| pH | 7.47 ± 0.10 |
| Total As (mg · kg$^{-1}$) | 248.6 ± 44.9 |
| Total Cd (mg kg$^{-1}$) | 2.01 ± 0.26 |
| Cation exchange capacity (cmol · kg$^{-1}$) | 16.4 ± 0.60 |
| Organic material (mg · kg$^{-1}$) | 26.4 ± 0.21 |

The soil is dried in the air and passed through a 20-mesh sieve, and filled in a pot (10 kg/pot), and treated as follows: (1) blank control (CK); (2) adding 100 g of a slow-release iron-based biochar soil heavy metal passivator prepared in Example 1 (T1); (3) adding 100 g of a slow-release iron-based biochar soil heavy metal passivator prepared in Example 2 (T2); (4) adding 100 g of a slow-release iron-based biochar soil heavy metal passivator prepared in Example 3 (T3); (5) adding 100 g of a slow-release iron-based biochar soil heavy metal passivator prepared in Example 4 (T4); and (6) adding 100 g of ordinary biochar (T5). Three replicates are set up for each treatment and three rice seedlings are planted. The contents of available arsenic and cadmium in the soil and the contents of arsenic and cadmium in rice are analysed by collecting rice soil and rice seed samples after the rice maturation.

Figure 1:
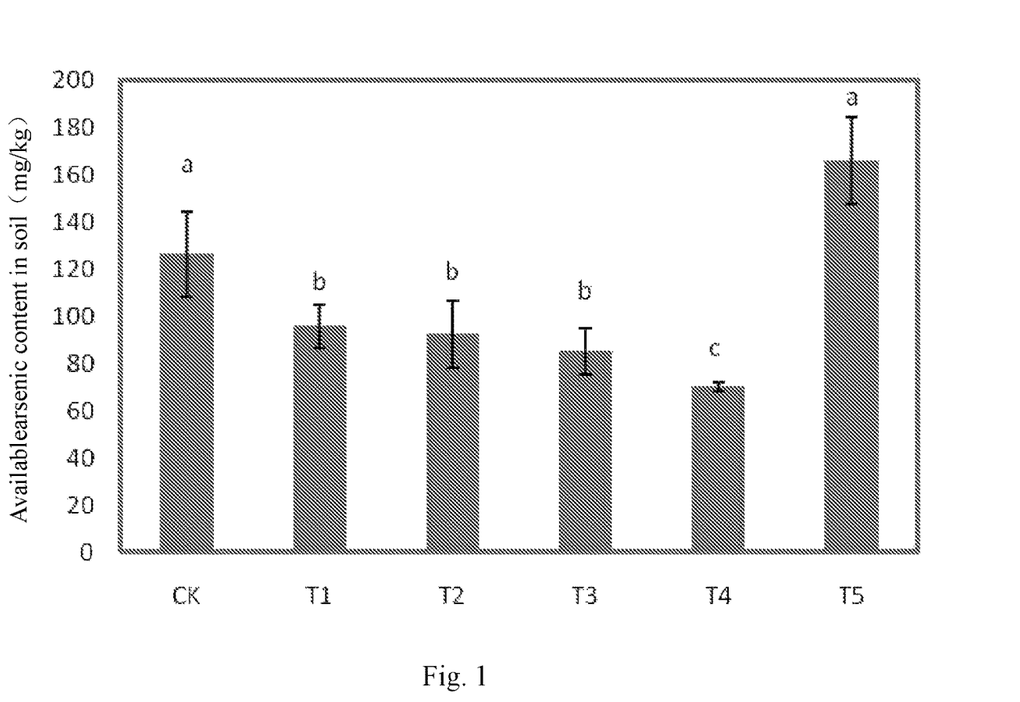
FIG. 1 shows the passivation effect of different passivators on arsenic in soil.
Figure 2:
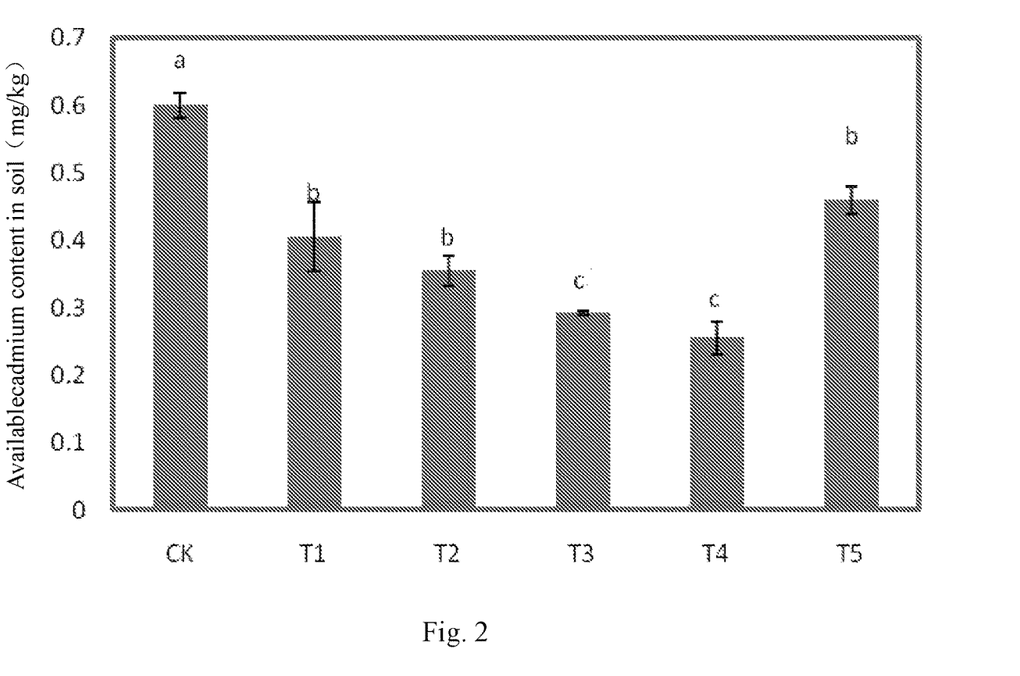
FIG. 2 shows the passivation effect of different passivators on cadmium in soil.
Figure 3:
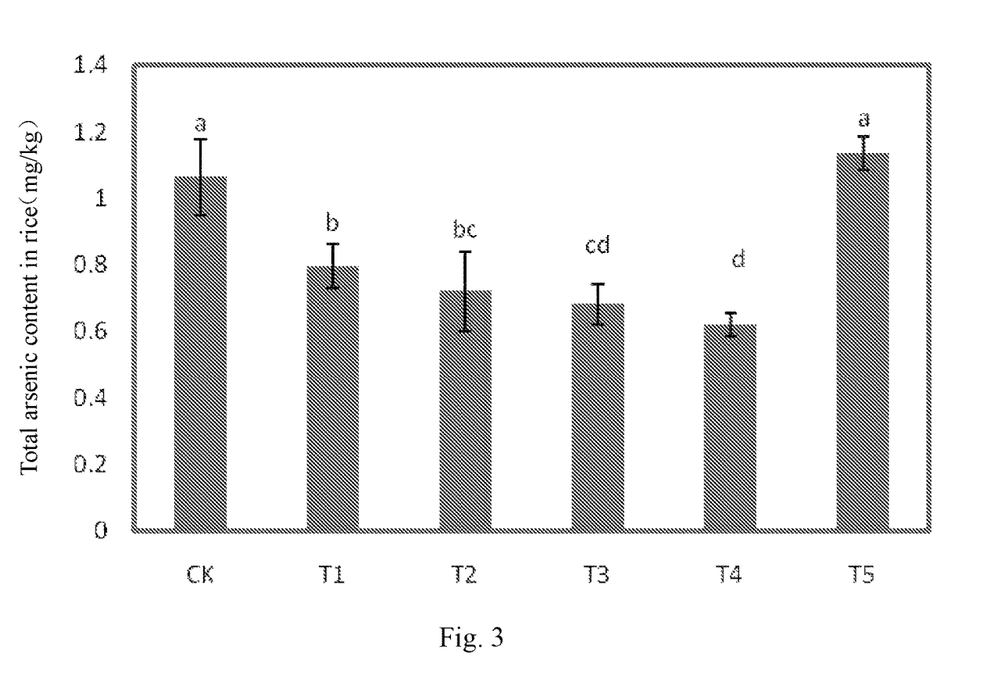
FIG. 3 shows the effect of different passivators on the arsenic content in rice.
Figure 4:
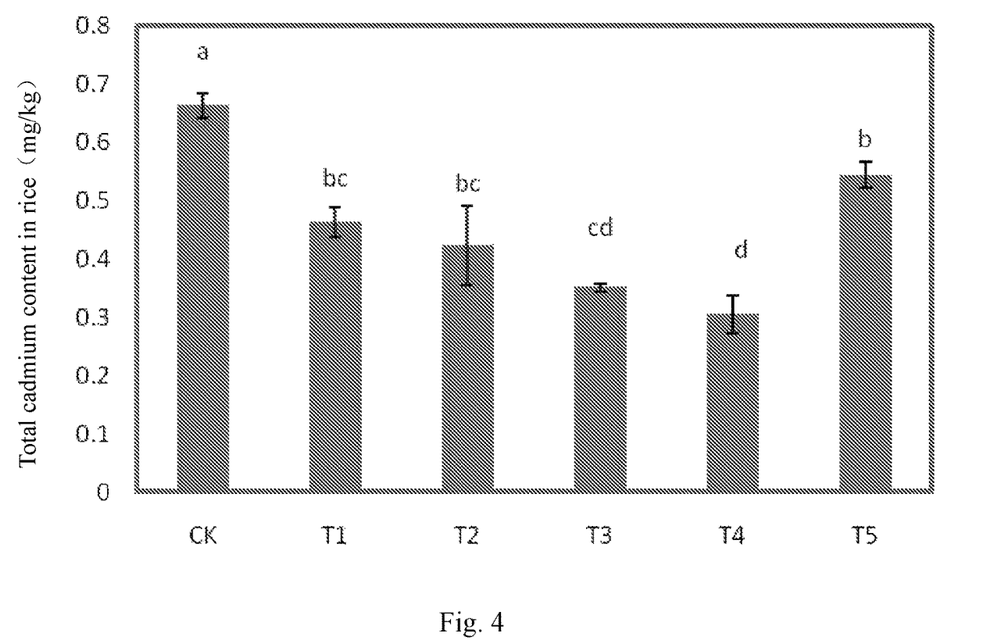
FIG. 4 shows the effect of different passivators on the cadmium content in rice.

As shown in FIGS. 1 and 2, the common biochar material has a certain passivation effect on soil cadmium, but cannot passivate arsenic but increase the effective arsenic content in the soil; compared with the control, the content of the available arsenic in the soil is increased by 31.8%, and the available cadmium content in the soil is reduced by 23.3%. The available arsenic and available cadmium contents in the soil can be significantly reduced by the application of the different slow-release iron-based biochar soil heavy metal passivators prepared by the present invention. Compared with the control, after the application of the passivator material of embodiments 1-4, the available arsenic content in the soil is reduced by 24.1%, 26.7%, 32.4% and 44.2%, respectively; the available cadmium content in the soil is reduced by 32.5%, 40.8%, 51.3% and 57.3%, respectively. In addition, the use of the slow-release iron-based biochar soil heavy metal passivator prepared by the present invention can also significantly reduce the arsenic and cadmium contents in rice (FIGS. 3 and 4), and compared with the control, the contents of arsenic in rice decreased by 25.2%, 32.4%, 36.0% and 41.8%, respectively; the cadmium content of rice decreased by 30.3%, 36.3%, 47.1% and 54.1%, respectively. However, the ordinary biochar passivator can only reduce the cadmium content of rice, but increase the arsenic content of rice (FIGS. 3 and 4). Compared with the conventional biochar material, the slow-release iron-based biochar heavy metal passivator prepared by the present invention not only can passivate the soil cadmium to reduce the cadmium content in rice, but also can reduce the arsenic content in the soil by passivating arsenic in the soil; in example 4 the "slow-release iron-based biochar soil passivator with palm fibres as raw material" has the best effect on the passivation of arsenic and cadmium accumulation in the soil.

EXAMPLE 6

Field Test for Long-term Effect of Material Prepared in the Present Invention on Passivation of Soil Heavy Metal The test site is located in Tongxi village, Shuitou town, Fugang county, Qingyuan city, Guangdong province, China; Cd-contaminated paddy field (0-30 cm) is collected and analysed, and the basic physical and chemical properties are analysed in the following table.

TABLE 2

Physical and chemical properties of soil in field test

| Test items | Content |
| --- | --- |
| pH | 4.58 ± 0.12 |
| Total As (mg · kg$^{-1}$) | 22.6 ± 1.3 |
| Total Cd (mg kg$^{-1}$) | 2.86 ± 0.32 |
| Cation exchange capacity (cmol · kg$^{-1}$) | 17.4 ± 0.64 |
| Organic material (mg · kg$^{-1}$) | 15.3 ± 0.27 |

The test crop is paddy rice, in which the early and late rice varieties are Tianyou 998 in 2013, and the early and late varieties are Tianyou 652 in 2014.

Test treatment: there are 3 treatments set up in total: (1) blank control, (CK); (2) before the transplanting of the first season rice (i.e., March 2013), 150 kg/acre of ordinary iron-based biochar is applied in one portion as a base fertilizer (T1); the ordinary iron-based biochar is prepared by the following method: rice palm fibres are dried in the air, and 95 kg is weighed and crushed, placed in a high-temperature furnace; the temperature is increased to 500° C. under the conditions of isolation at a rate of 10° C./min, and heat is performed at this temperature for 3 h, and then the heating is stopped. 200 L of a ferrous sulphate solution with an iron content of 2.5% by mass is prepared and quickly added into a high temperature furnace and maintained at a temperature of 150° C. by heating while stirring, followed by cooling, drying in the air, crushing and passing through a 60-mesh sieve to obtain the iron-based biochar with an iron mass fraction of 5%. (3) Before the transplanting of the first season rice (i.e., March 2013), 150 kg/acre of slow-release iron-based biochar soil heavy metal passivator prepared in example 4 is applied in one portion as a base fertilizer (T2); it is required that the paddy field had been ploughed evenly and flooded 3-5 cm when applied, and the seedlings are transplanted 7 days after the application. Each treatment is repeated 4 times, in a random arrangement; there are 12 experimental plots in total, and each plot area has an area of 5*4=20 m$^2$, to ensure independent irrigation and drainage. After the early rice (first season) has been harvested in July 2013, the second season rice is continued to be planted in the original plot; after the second season rice has been harvested, the third season rice is continued to be planted in April 2014; after the third season rice has been harvested, the fourth season rice is continues to be planted in July 2014. 4 rounds of rice are planted in total, and soil and rice samples are collected to analyse available arsenic and available cadmium contents in soil, and analyse the arsenic and cadmium content in rice.

Figure 5:
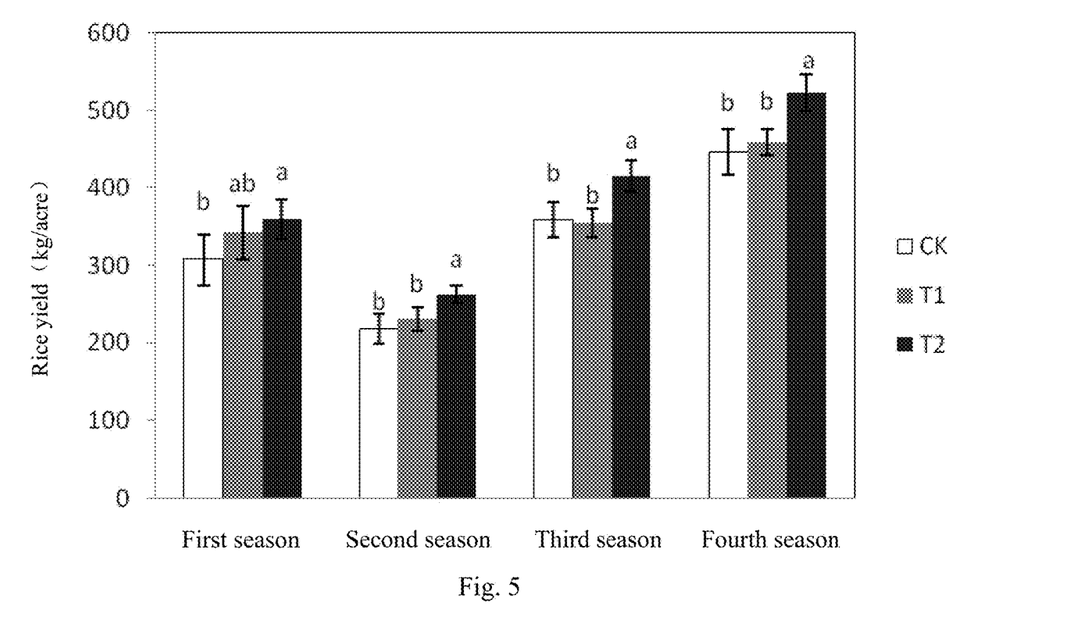
FIG. 5 shows the effect of different passivator application on the rice yield in the four growing seasons.
Figure 6:
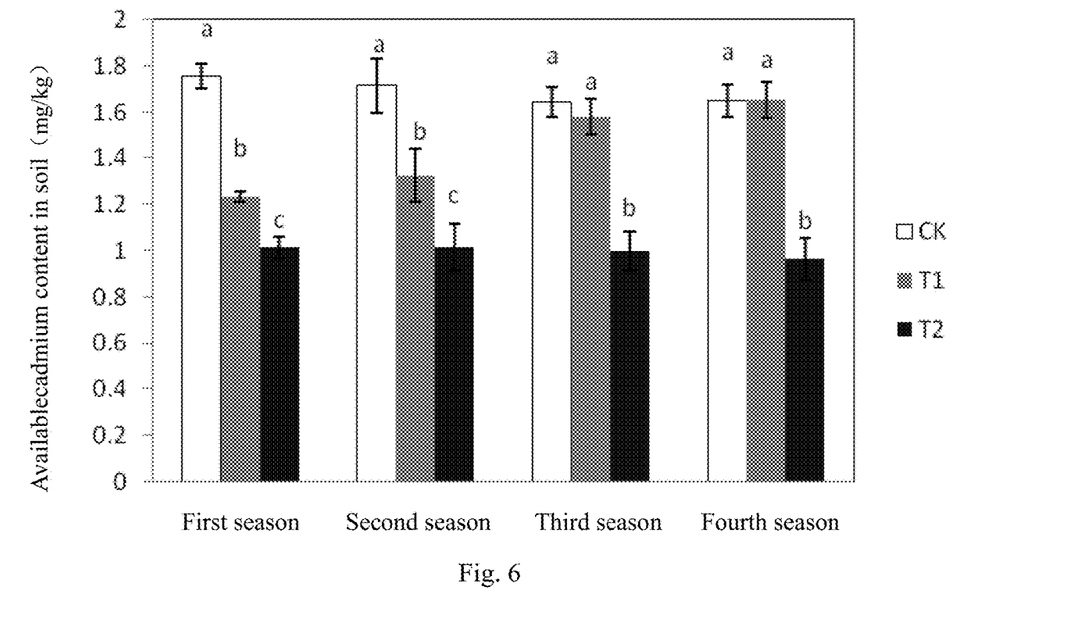
FIG. 6 shows the effect of different passivator application on the available cadmium in paddy soil in the four growing seasons.
Figure 7:
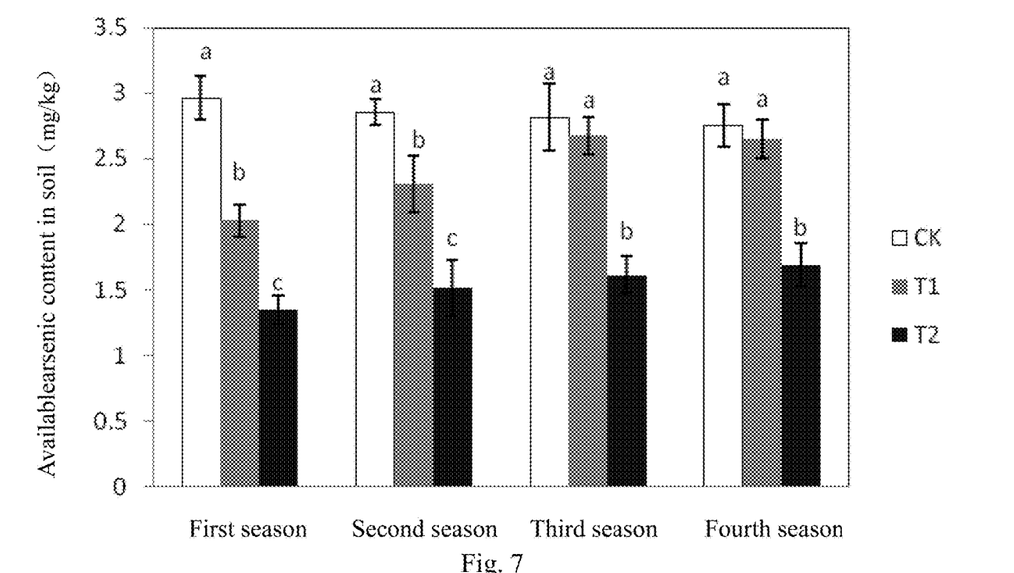
FIG. 7 shows the effect of different passivator application on the available arsenic in paddy soils in the four growing seasons.
Figure 8:
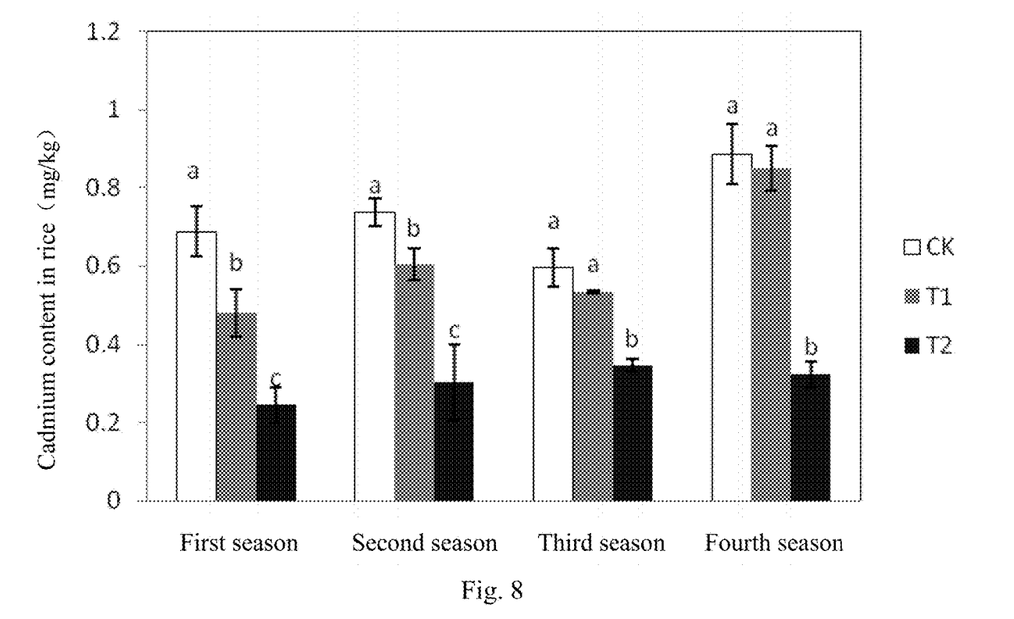
FIG. 8 shows the effect of different passivator application on the cadmium content in rice in the four growing seasons.
Figure 9:
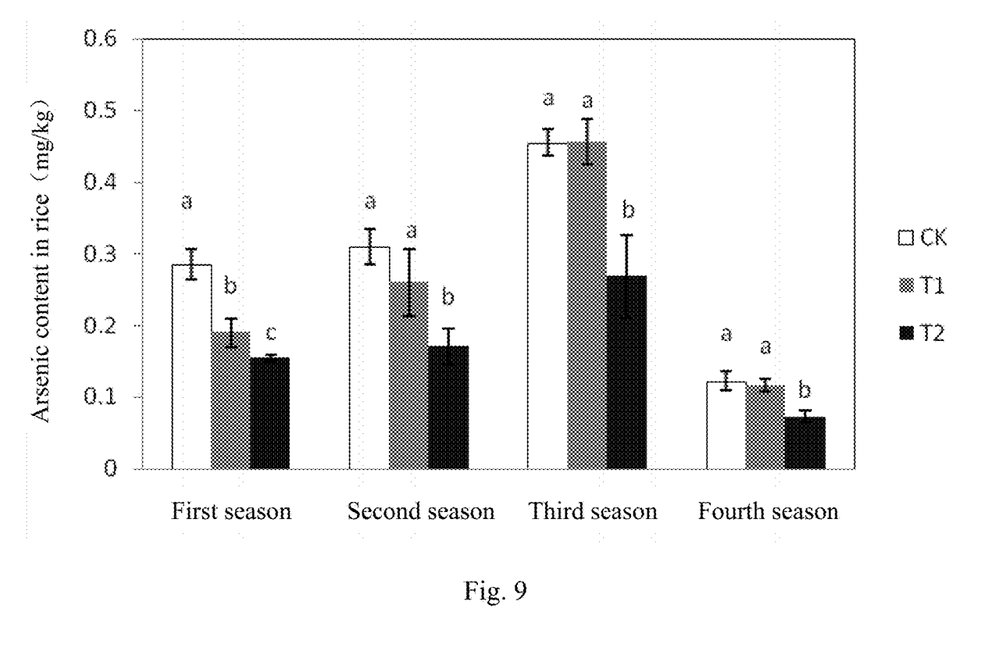
FIG. 9 shows the effect of different passivator application on the arsenic content in rice in four growing seasons.

As shown in FIG. 5, the application of the slow-release iron-based biochar soil heavy metal passivator prepared in Example 4 significantly increases the rice yield, which was 17.1%, 20.2%, 15.5% and 17.2% higher than the control, respectively; however, the application of common iron-based biochar has no significant effect on the yield of rice in the four growing seasons. As shown in FIGS. 6 and 7, only in the first and second season paddy soil, the available arsenic and available cadmium contents are significantly reduced, wherein the available arsenic is reduced by 31.4% and 19.0%, respectively, and the available cadmium is reduced by 29.8% and 22.9%, respectively. However, the application of the slow-release iron-based biochar soil heavy metal passivator prepared in example 4 has a significant passivation effect on arsenic and cadmium in the soil of all the four growing seasons; compared with the control, the available arsenic in the soil is reduced by 54.5%, 47.0%, 42.6% and 38.7%, respectively, and the available cadmium in the soil is reduced by 42.2%, 40.9%, 39.7% and 41.7%, respectively. Similarly, compared with the reduction of control, by the application of the ordinary iron-based biochar only in the first and second seasons, the rice cadmium content is significantly reduced by 30.2% and 18.0%; compared with the reduction of the control, by the application of ordinary iron-based biochar, only the arsenic content in the first season rice is significantly reduced by 33.8%. However, the application of the slow-release iron-based biochar soil heavy metal passivator prepared in example 4 has a significant reduction effect on the arsenic and cadmium of the rice in all of the four growing seasons; as compared with the control, the arsenic content in the rice of the four growing seasons is reduced by 46.0%, 45.2%, 40.9% and 41.1%, respectively, and the cadmium content in the rice is reduced by 64.5%, 58.9%, 42.2% and 63.5%, respectively (FIGS. 8 and 9). Therefore, compared with the ordinary iron-based biochar, the "slow-release iron-based biochar soil heavy metal passivator with palm fibres as raw material" prepared in the present invention can effectively and continuously passivate the heavy metal arsenic and cadmium in soil and inhibit the absorption and accumulation of cadmium and arsenic; the slow-release iron-based biochar soil passivator prepared by the method can last for 4 growing seasons, and has a higher passivation efficiency and a longer action time than common iron-based biochar passivators.

The above embodiments are preferred embodiments of the present invention, but the embodiments of the present invention are not limited to the above-described embodiments, and any other changes, modifications, substitutions, combinations, simplifications made without departing from the spirit and principle of the present invention should be equivalent replacements and are to be included within the scope of the present invention.

The invention claimed is:

1. A method for preparing a slow-release iron-based biochar soil heavy metal passivator, characterized by comprising the steps of:
   (1) drying a biomass in the air and crushing the same, increasing the temperature to 300° C. to 800° C. under the conditions of air isolation, and keeping this temperature for 3 to 12 hours to prepare the iron-based biochar precursor;
   (2) formulating a ferric salt or ferrous salt into a solution of an iron content of 0.5% to 5% by mass;
   (3) to the iron-based biochar precursor prepared in step (1) adding, under stirring, the iron-containing solution prepared in step (2) under the conditions of keeping the temperature at 80 to 350° C., the mass ratio of the iron-based biochar precursor to the iron-containing solution is 1:0.2 to 1:5; after having been stirred until uniform, cooling the mixture to room temperature, drying, crushing and sieving to prepare the iron-based biochar material;
   (4) mixing the iron-based biochar material prepared in step (3), kaolin and bio-starch at 100: 0.5:1 to 100:5:10 by weight part, until uniform, adding water or spraying water under stirring to a water content of 50% to 80%, and then drying to obtain the core material;
   (5) adding a chitosan solution into an acidic silica sol at 55-75° C. under the stirring conditions to control the volume ratio of the chitosan solution to the acidic silica sol to 1:2 to 1:5, after the completion of the addition, heating the same at 55-75° C. for 0.5-1 h to obtain an acidic coating material precursor; adding an emulsifier to the prepared acid coating material precursor under stirring at 55-75° C., wherein the emulsifier is control in an amount of 0.5% to 5% of the chitosan, stirring until uniform, then adding an alkaline catalyst for catalysis, and keeping the conditions of 55 to 75° C. under stirring for 1 to 1.5 h, controlling the pH to 9 to 11; removing bubbles by vacuum, to prepare an alkaline coating material;
   (6) coating the core material prepared in step (4) with the alkaline coating material prepared in step (5), and controlling the mass volume ratio of the core material to the alkaline coating material to 30:1 to 5:1, and drying the coating in the air to obtain a slow-release iron-based biochar soil heavy metal passivator.

2. The method for preparing a slow-release iron-based biochar soil heavy metal passivator according to claim 1, wherein in step (1) the temperature is increased to 300° C. to 800° C. at a rate of 5° C. to 10° C./min; and the biomass in step (1) is one or more of the roots, stems and leaves of waste woody or herbaceous plants.

3. The method for preparing a slow-release iron-based biochar soil heavy metal passivator according to claim 1, wherein the ferric salt in step (2) is selected from at least one member of the group consisting of: iron chloride, ferric nitrate, and ferric sulphate; and the ferrous salt is selected from at least one member of the group consisting of: ferrous chloride, ferrous nitrate and ferrous sulphate.

4. The method for preparing a slow-release iron-based biochar soil heavy metal passivator according to claim 1, wherein the temperature of the iron-based biochar precursor in step (3) is maintained at 100 to 200° C.; and the sieving in step (3) means passing through a 60-mesh sieve.

5. The method for preparing a slow-release iron-based biochar soil heavy metal passivator according to claim 1, wherein the bio-starch in the step (4) is corn flour, sweet potato flour, potato flour or tapioca flour; and the particle size of the core material prepared in step (4) is 3 to 5 mm.

6. The method for preparing a slow-release iron-based biochar soil heavy metal passivator according to claim 1, wherein the weight ratio of the iron-based biochar material, the kaolin and the bio-starch in step (4) is 100:1:2:100:2.5:5.

7. The method for preparing a slow-release iron-based biochar soil heavy metal passivator according to claim 1, wherein the emulsifier in step (5) is selected from at least one member of the group consisting of: polyacrylamide, sodium alkyl benzene sulfonate, Arabian gum, Twain series, and Span series; the alkaline catalyst is selected from at least one member of the group consisting of: sodium hydroxide, potassium hydroxide, and aqueous ammonia; and the acidic silica sol is controlled at a pH value of 1 to 4 and the mass fraction of silica is 5 to 15%.

8. The method for preparing a slow-release iron-based biochar soil heavy metal passivator according to claim 1, wherein the mass volume ratio of the core material to the alkaline coating material described in step (6) is 15:1 to 10:1; and the thickness of the coating is 0.5 to 1 mm.

9. A slow-release iron-based biochar soil heavy metal passivator prepared by the method for preparing a slow-release iron-based biochar soil heavy metal passivator according to claim 1.

10. A method for using the slow-release iron-based biochar soil heavy metal passivator according to claim 9, wherein the method comprises the following steps: after ploughing a paddy field evenly, uniformly applying the slow-release iron-based biochar soil heavy metal passivator of 100 to 300 kg as a base fertilizer; during the application the field being maintained flooded at 3 to 5 cm; and transplanting rice 5 to 10 days after the application.

* * * * *

UNITED STATES PATENT AND TRADEMARK OFFICE
CERTIFICATE OF CORRECTION

PATENT NO. : 10,633,588 B2
APPLICATION NO. : 15/571182
DATED : April 28, 2020
INVENTOR(S) : Chuanping Liu and Fangbai Li Page 1 of 1

It is certified that error appears in the above-identified patent and that said Letters Patent is hereby corrected as shown below:

In the Claims

Column 12, Lines 39 and 40, delete "is selected from at least one member of the group" and insert --is comprising at least one member selected from the group--

Column 12, Lines 41 and 42, delete "is selected from at least one member of the group" and insert --is comprising at least one member selected from the group--

Column 12, Lines 60 and 61, delete "is selected from at least one member of the group" and insert --is comprising at least one member selected from the group--

Column 12, Lines 63 and 64, delete "is selected from at least one member of the group" and insert --is comprising at least one member selected from the group--

Signed and Sealed this
Twenty-third Day of June, 2020

Andrei Iancu
*Director of the United States Patent and Trademark Office*